(12) United States Patent
List et al.

(10) Patent No.: US 12,168,523 B2
(45) Date of Patent: Dec. 17, 2024

(54) APPARATUS AND METHOD FOR DISPLAYING PILOT AUTHORITY

(71) Applicant: BETA AIR, LLC, South Burlington, VT (US)

(72) Inventors: Alexander Hoekje List, South Burlington, VT (US); Vincent Moeykens, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,729

(22) Filed: Oct. 14, 2022

(65) Prior Publication Data
US 2024/0124152 A1   Apr. 18, 2024

(51) Int. Cl.
  B64D 43/00   (2006.01)
  B64C 29/00   (2006.01)
(52) U.S. Cl.
  CPC .......... B64D 43/00 (2013.01); *B64C 29/0016* (2013.01)
(58) Field of Classification Search
  CPC ........................ B64D 43/00; B64C 29/0016
  See application file for complete search history.

(56) References Cited

U.S. PATENT DOCUMENTS

| | | | |
|---|---|---|---|
| 4,371,936 A * | 2/1983 | Adams ................. | G05D 1/0858 701/7 |
| 4,910,513 A * | 3/1990 | Kelly ................... | G01C 23/005 340/975 |
| 5,404,305 A * | 4/1995 | Stiles, Jr. ............. | B64C 13/0421 244/234 |
| 5,935,177 A * | 8/1999 | Cox ...................... | G05D 1/0816 701/9 |
| 6,535,118 B1 * | 3/2003 | Takagi .............. | G08B 13/19656 709/219 |
| 11,001,376 B2 | 5/2021 | Marzella | |
| 11,142,333 B1 | 10/2021 | Richter | |
| 11,230,372 B1 | 1/2022 | Griffin | |
| 11,518,497 B2 | 12/2022 | Spiegel | |
| 11,560,225 B2 | 1/2023 | Spiegel | |
| 11,652,254 B2 | 5/2023 | Donovan | |
| 11,652,255 B2 | 5/2023 | Donovan | |
| 11,697,495 B1 | 7/2023 | Henck | |
| 2009/0222151 A1 * | 9/2009 | Averseng ............ | G05D 1/0066 701/8 |
| 2018/0218619 A1 * | 8/2018 | Brown ................. | G08G 5/0069 |
| 2019/0329898 A1 * | 10/2019 | Jenkins ................ | G05D 1/0808 |
| 2019/0359321 A1 * | 11/2019 | Bosworth .............. | B64C 13/16 |
| 2020/0336430 A1 * | 10/2020 | Kim ........................ | H04L 45/02 |
| 2021/0034053 A1 * | 2/2021 | Nikolic ................ | G08G 5/025 |
| 2021/0371123 A1 * | 12/2021 | List ...................... | B64D 31/06 |
| 2022/0043464 A1 | 2/2022 | Seiferth | |
| 2022/0101738 A1 | 3/2022 | Ramachandra | |
| 2023/0023907 A1 * | 1/2023 | Wiegman ............. | B64C 13/505 |
| 2023/0023926 A1 * | 1/2023 | Auerbach ............ | G05D 1/0833 |

(Continued)

*Primary Examiner* — Donald J Wallace
*Assistant Examiner* — Jalal C Coduroglu
(74) *Attorney, Agent, or Firm* — Lee & Hayes, P.C.

(57) ABSTRACT

This application discloses an apparatus and method for displaying pilot control authority. This apparatus and method include using a controller to identify a condition of an aircraft and determine a limitation in pilot control authority. Using this, an indicator on a display may show a visual representation of a pilot control authority, the limitations thereof, and a pilot input.

20 Claims, 8 Drawing Sheets

(56) References Cited

U.S. PATENT DOCUMENTS

2023/0058992 A1* 2/2023 Moeykens ............. G06F 21/31
2023/0136273 A1* 5/2023 Wiegman ........... B64C 29/0025
                                                                320/128

* cited by examiner

APPARATUS AND METHOD FOR DISPLAYING PILOT AUTHORITY

FIELD OF THE INVENTION

The present invention generally relates to the field of pilot displays. In particular, the present invention is directed to an apparatus and method for displaying pilot authority.

BACKGROUND

Current pilot displays for aircrafts with multiple motors shows the torque produced by each lift motor using four quadrants. However, this display does not show the pilot how much control they have in each axis (pitch, yaw, roll, lift).

SUMMARY OF THE DISCLOSURE

In an aspect an apparatus for displaying pilot control authority includes a controller, a memory communicatively connected to the controller and configured to contain instructions configuring controller to: identify a condition of the aircraft, determine a limitation in pilot control authority of an element, and a display communicatively connected to the controller and comprising an indicator, the indicator configured to show a visual representation of the pilot control authority of the element.

In another aspect a method for displaying pilot control authority includes identifying, using a controller, a condition of an aircraft, determining, using a controller, a limitation in pilot control authority of an element, and displaying, using an indicator on a display communicatively connected to the controller, a visual representation of the pilot control authority of the element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
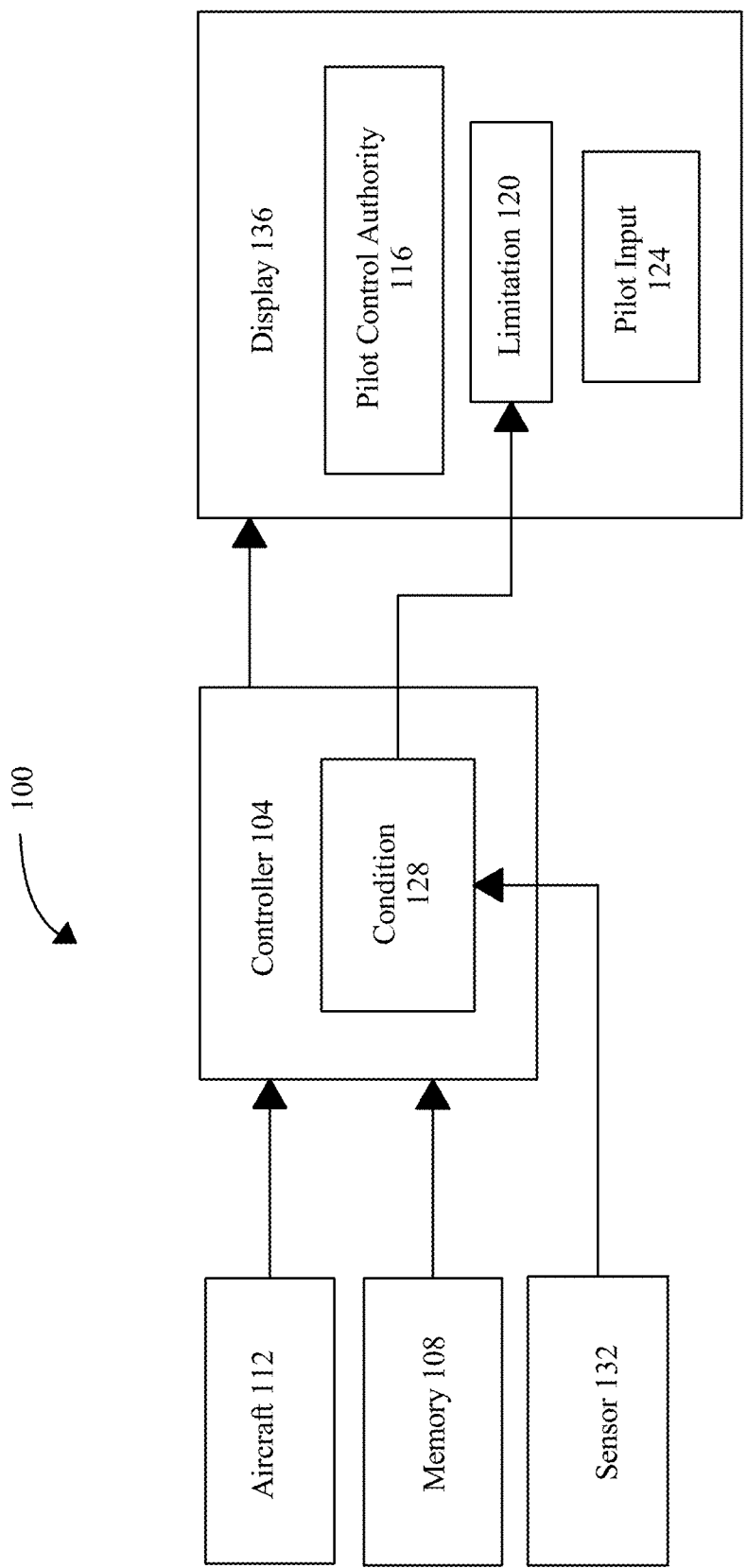
FIG. 1 is a block diagram of an exemplary embodiment for displaying pilot control authority in accordance with one or more embodiments of the present disclosure.

Referring now to FIG. 1, an exemplary embodiment of an apparatus 100 for displaying pilot control authority is illustrated. Axis refers to pitch, yaw, roll, and lift of an aircraft. Apparatus 100 includes a controller 104. Controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 104 may include a single computing device operating independently, or may include two or more computing device operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, apparatus 100 includes memory 108. Memory 108 may be communicatively connected to controller 104 and may be configured to store information and/or data related to apparatus 100, such as aircraft conditions, which may include battery data, propulsor data, and the like. Memory 108 may include one or more memory devices to store data and information and/or datum related to pilot control authority of aircraft 112. Memory 108 may include various types of memory for such information storage, such as EEPROM (Electrically-Erasable Read-Only Memory), flash memory, volatile memory, non-volatile memory, RAM (Random-Access Memory), ROM (Read-Only Memory), a disk drive, and the like. In various embodiments, controller 104 may be configured to execute software instructions stored on memory 108 to perform various methods, processes, or operations in the manner described in this disclosure. In one or more embodiments, memory 108 is communicatively connected to controller 104 and configured to contain instructions configuring controller 104 to determine a limitation 120 of a pilot control authority 116 of a pilot input 124 (also referred to as "input"), as discussed further below in this disclosure. Pilot input 124 may include lift input, pitch input, yaw input, lift input. In some embodiments, limitation 120 may include a limitation on pitch input. In other embodiments, limitation 120 may include limitations on roll input. In other embodiments, limitation 120 may include limitations on lift input. In other embodiments, limitation 120 may include limitations on yaw input. Memory 108 may be configured to store information and data related to limitation 120, pilot control authority 116, aircraft 112, and the like. In one or more embodiments, memory 108 may include a storage device, as described further in this disclosure below. In one or more embodiments, memory 108 may store a database such as a database related to electric aircraft 112. Memory 108 may store upper and lower bounds of a limitation 120, pilot control authority 116, and the like in a lookup table, as discussed further below in this disclosure. In one or more embodiments, limitation 120 may be determined using machine-learning. For instance, and without limitation, a generated machine-learning model may determine limitation 120. In an embodiment, machine-learning model may determine limitations 120 on pilot control authority 116 for different inputs 124 on pitch, yaw, roll, and lift through the use of training data. Training data may include data on prioritization of different inputs 124 based on different conditions of the aircraft 112. For example, training data may include data that pitch takes priority over roll which takes priority over lift which takes priority over yaw. Machine-learning model make take inputs of aircraft condition and pilot input and output a limitation for each of the inputs. In an embodiment, a pilot may be limited in pilot control authority 116 of yaw if lift motors are already at max speed to generate lift.

Still referring to FIG. 1, pitch, roll, and yaw may be used to describe an aircraft's attitude and/or heading, as they correspond to three separate and distinct axes about which the aircraft may rotate with an applied moment, torque, and/or other force applied to at least a portion of an aircraft. The three axes may include a longitudinal axis, transverse axis, and yaw axis. "Longitudinal axis", as used herein, refers to an imaginary axis that runs along the axis of symmetry of the fuselage. "Transverse axis", as used herein, runs parallel to a line running from wing tip to wing tip of the aircraft, which is orthogonal to the longitudinal axis. "Yaw axis", as used herein, is an imaginary axis that runs orthogonal to the longitudinal and transverse axis. "Pitch", for the purposes of this disclosure refers to an aircraft's angle of attack, and is aircraft's rotation about the transverse axis. For example, an aircraft pitches "up" when the angle of attack is positive, like in a climb maneuver. In another example, the aircraft pitches "down", when the angle of attack is negative, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to rotation about an aircraft's longitudinal axis. "Yaw", for the purposes of this disclosure, refers to rotation about the yaw axis. As used in this disclosure a "lift" is a perpendicular force to the oncoming flow direction of fluid surrounding the surface. For example, and without limitation relative air speed may be horizontal to aircraft 112, wherein lift force may be a force exerted in a vertical direction, directing aircraft 112 upwards. Propulsors are discussed in further detail in FIG. 3.

In one or more embodiments, apparatus 100 may be used on any aircraft 112 capable of transitioning flight modes (e.g., from hover to conventional flight, or vice versa). For example, aircraft may include an electric vertical takeoff and landing (eVTOL), a VTOL, a tilt rotor, a tiltwing, and/or a helicopter. Aircraft may include an electric aircraft, which may be any aircraft powered by electricity, such as one or more electric motors and/or battery systems. In some embodiments, electric aircraft may be powered solely by electricity. In other embodiments, electric aircraft may be partially powered by electricity, such as a hybrid-electric aircraft. Apparatus 100 may assist a pilot in visualizing control of an aircraft by displaying pilot control authority 116, the limitations 120 of the pilot control authority 116, and pilot input 124. As used herein, "pilot control authority" is the total amount of command a pilot has over an element such as pitch, yaw, roll, lift, and the like. An "element" as used herein is a degree of freedom for an aircraft. An element may include, as non-limiting examples, pitch, yaw, roll, and lift. "Limitations" as used herein is a reduction in the amount of control from the total possible pilot control authority of an element. For example, the torque available for the yaw input may be limited to 80%. "Pilot input" as used herein is what a command the pilot puts in for an element. For example, a pilot input may be the commanded torque for a flight component that affects an element. Transition between flight modes of an electric aircraft may be consistent with disclosure of U.S. patent application Ser. No. 17/825,371 filed on May 26, 2022, and titled "AN APPARATUS FOR GUIDING A TRANSITION BETWEEN FLIGHT MODES OF AN ELECTRIC AIRCRAFT", the entirety of which is incorporated by reference herein in its entirety.

Still referencing FIG. 1, aircraft 112 may include a plurality of flight components. As used in this disclosure a "flight component" is a portion of an aircraft that can be moved or adjusted to affect movement of the aircraft in a fluid medium. A flight component may be an actuator. For example, flight component may include a component used to affect the aircraft's roll, yaw, or pitch. In one or more embodiments, flight component may include a plurality of flight components. In an embodiment, flight component may be mechanically connected or otherwise attached to an aircraft. As used herein, a person of ordinary skill in the art would understand "mechanically connected" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referencing FIG. 1, in one or more embodiments, flight component may include an aerodynamic surface attached to aircraft 112 and that interacts with forces to mobilize aircraft 112. For example, and without limitation, a flight component may include ailerons, flaps, leading edge flaps, rudders, elevators, spoilers, slats, blades, stabilizers, stabilators, airfoils, a combination thereof, or any other moveable surface used to control an aircraft in a fluid medium.

In other embodiments, flight component may include landing gear. For example, and without limitation, flight component may include skis or wheels attached to a base of a fuselage of aircraft 112.

In one or more embodiments, flight component may include a lift component (or lift component assembly), which may include a rotor and a motor. Rotor may include blades attached to a hub or may be manufactured as a single piece with an integral hub. Hub may provide a central structure to which blades connect, and in some embodiments, may be made in a shape that envelops motor. Motor may include a rotating part and a stationary part. In one embodiment, rotating part may be concentric to stationary part, known as a radial flux motor. In this embodiment, stationary part may form the outer ring of motor, known as an inrunner motor, or stationary part may form the inner ring of motor, known as an outrunner motor. In other embodiments, rotating and stationary parts may be flat and arranged in opposition to each other, known as an axial flux motor. Rotor may be attached to rotating part of motor. Stationary part of motor, in one embodiment, may be attached to propulsion boom 144. In some embodiments, motor may be a permanent magnet motor and may be controlled by an electronic motor controller. Electronic motor controller may be configured to send electrical currents to motor in a precise sequence to allow rotor to turn at a desired speed or with a desired torque. In some embodiments, this motor controller may be coupled or communicatively connected to controller 104 or may be a part of controller 104. In one or more embodiments, flight component may include an electrical load. For example, and without limitation, a flight component may include a plurality of loads.

In other embodiments flight component may include a propulsion system. For example, and without limitation, flight component may include a propulsor or a lift component. For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. In one or more exemplary embodiments, a propulsor may include a vertical propulsor or a forward propulsor. A forward propulsor may include a propulsor configured to propel aircraft 112 in a forward direction. A vertical propulsor may include a propulsor configured to propel aircraft 112 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In an embodiment, a propulsor may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 1, a propulsor may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 108 forward with an equal amount of force. In an embodiment, and without limitation, the more air forced behind aircraft, the greater the thrust force with which aircraft 108 is pushed horizontally will be. In another embodiment, and without limitation, forward thrust may force aircraft 108 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In one or more embodiments, flight component may include a motor and a rotor. Motor may include, without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and/or dynamic braking. In one or more embodiments, motor may include an electromechanical clutch. In one or more embodiments, motor may include a plurality of motors. In one or more embodiments, motor may be mechanically connected to an actuator, which may move flight component upon actuation, which is controlled by motor. For example, an actuator may be a lever arm that lifts or lowers an aileron according to a control signal from, for example, a pilot.

In one or more embodiments, motor may include or be connected to one or more sensors detecting one or more conditions of motor. One or more conditions may include, without limitation, voltage levels, electromotive force, current levels, temperature, current speed of rotation, position sensors, torque, and the like. For instance, and without limitation, one or more sensors may be used to detect torque, or to detect parameters used to determine torque, as described in further detail below. One or more sensors may include a plurality of current sensors, voltage sensors, speed or position feedback sensors, and the like. A sensor may communicate a current status of motor to a person, operating system or a computing device; computing device may include any computing device as described below, including without limitation, a controller, a processor, a microprocessor, a control circuit, a flight controller, or the like. In one or more embodiments, computing device may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described herein. In an embodiment, propulsors may receive differential power consumption commands, such as a propeller or the like receiving command to generate greater power output owing a greater needed contribution to attitude control, or a wheel receiving a greater power output due to worse traction than another wheel under slippery conditions.

In one or more embodiments, a rotor may include blades attached to a hub, or may be manufactured as a single piece with an integral hub. Hub may provide a central structure to which blades connect, and in some embodiments, may be made in a shape that envelops motor. Motor may include a rotating part and a stationary part. In one embodiment, rotating part may be concentric to stationary part, known as a radial flux motor. In this embodiment, stationary part may form the outer ring of motor, known as an in runner motor, or stationary part may form the inner ring of motor, known as an outrunner motor. In other embodiments, rotating and stationary parts may be flat and arranged in opposition to each other, known as an axial flux motor. Rotor may be attached to rotating part of motor. Stationary part of motor, in one embodiment, may be attached to propulsion boom. In some embodiments, motor may be a permanent magnet motor and may be controlled by an electronic motor controller. Electronic motor controller may be configured to send electrical currents to motor in a precise sequence to allow rotor to turn at a desired speed or with a desired torque. In some embodiments, this motor controller may be coupled or communicatively connected to controller or may be a part of controller.

Still referencing FIG. 1, controller 104 is configured to identify a condition 128 of aircraft 112. As used herein a "condition" of an aircraft refers to the status of flight components within aircraft and/or aircraft. In an embodiment, condition of an aircraft may include a state of charge of an energy source on the aircraft 112. Energy sources, as discussed in FIG. 3, supply energy to flight components of aircraft 112. A "state of charge" of energy source, as used herein, is the level of charge of an energy source relative to capacity. As used herein, an "energy source" is a form of potential energy that can be used to perform work. For example, an energy source may be a battery such as a lithium metal battery, a lithium ion battery, and the like. Additionally, conditions 128 of aircraft 112 may include the RPM of motors, attitude of aircraft 112, temperature of energy source, and the like. Conditions 128 of aircraft 112 further include status of flight components, such as the health of flight components, whether the components are failing, position of flight components, velocity of flight components, and the like. Conditions 128 may include parameters such as an angle of attack, thrust, torque, power consumption, angular velocity, climb rate, structural limitations of electric aircraft, environmental and/or external limitations surrounding electric aircraft, and the like. Conditions 128 of aircraft 112 may be detected using a sensor, such as sensor 132. Additionally, conditions 128 may be external conditions affecting aircraft 112 such as weather (i.e. wind).

In one or more embodiments, sensor 132 may include an encoder. As used herein, a "sensor" is a device which detects or measures a physical property. A detected measurement may include a direct reading of a speed or RPM of propulsor, which may be a condition 128. Detected measurement may include measurements of other characteristics of propulsor that may be used by controller 104 to calculate a condition 128. For example, a measurement of an actuation of a pilot control, such as a pushing of a throttle lever, may be used to identify a thrust envelope parameter. A pilot control may include, for example and without limitation, a wheel, pedal, button, switch, knob, lever, stick, or any other device and or mechanism used by a pilot to control movement of aircraft 112 through a medium. In one or more embodiments, sensor 132 may include one or more shaft (rotary type) encoder, photoelectric (optical type) sensor, and/or magnetic rotational speed (proximity type) sensor to detect an RPM or rotational speed of motor and/or propulsor of aircraft 112.

Still referring to FIG. 1, sensor 132 may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 132 may include, torque sensor, gyroscope, accelerometer, magnetometer, inertial measurement unit (IMU), pressure sensor, force sensor, proximity sensor, displacement sensor, vibration sensor, or the like. For example, without limitation, sensor 132 may include a gyroscope that is configured to detect a current aircraft orientation, such as roll angle.

In one or more embodiments, sensor 132 may include a plurality of weather sensors. In one or more embodiments, sensor 132 may include a wind sensor. In some embodiments, a wind sensor may be configured to measure a wind datum. A "wind datum" may include data of wind forces acting on an aircraft. Wind datum may include wind strength, direction, shifts, duration, or the like. For example, and without limitations, sensor 132 may include an anemometer. An anemometer may be configured to detect a wind speed. In one or more embodiments, the anemometer may include a hot wire, laser doppler, ultrasonic, and/or pressure anemometer. In some embodiments, sensor 132 may include a pressure sensor. "Pressure," for the purposes of this disclosure and as would be appreciated by someone of ordinary skill in the art, is a measure of force required to stop a fluid from expanding and is usually stated in terms of force per unit area. The pressure sensor that may be included in sensor 132 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressor sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

In one or more embodiments, sensor 132 may include an altimeter that may be configured to detect an altitude of aircraft 112. In one or more embodiments, sensor 132 may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. In one or more embodiments, sensor 132 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. In some embodiments, sensor 132 may include a meteorological radar that monitors weather conditions. In some embodiments, sensor 132 may include a ceilometer. The ceilometer may be configured to detect and measure a cloud ceiling and cloud base of an atmosphere. In some embodiments, the ceilometer may include an optical drum and/or laser ceilometer. In some embodiments, sensor 132 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor 132 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, sensor 132 may include a lightning detector. The lightning detector may be configured to detect and measure lightning produced by thunderstorms. In some embodiments, sensor 132 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 132 may include an inertia measurement unit (IMU). The IMU may be configured to detect a change in specific force of a body.

In one or more embodiments, sensor 132 may include a local sensor. A local sensor may be any sensor mounted to aircraft 112 that senses objects or phenomena in the environment around aircraft 112. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like. In one or more embodiments, sensor 132 may include a navigation sensor. For example, and without limitation, a navigation system of aircraft 112 may be provided that is configured to determine a geographical position of aircraft 112 during flight. The navigation may include a Global Positioning System (GPS), an Attitude Heading and Reference System (AHRS), an Inertial Reference System (IRS), radar system, and the like.

In one or more embodiments, sensor 132 may include electrical sensors. Electrical sensors may be configured to measure voltage across a component, electrical current through a component, and resistance of a component. In one or more embodiments, sensor 132 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 132, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

In one or more embodiments, sensor 132 may include a sensor suite which may include a plurality of sensors that may detect similar or unique phenomena. For example, in a non-limiting embodiment, sensor suite may include a plurality of accelerometers, a mixture of accelerometers and gyroscope. Apparatus 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, sensor 132 may be configured to detect pilot input from pilot control and/or controller 112. In one or more embodiments, a pilot control may include buttons, switches, or other binary inputs in addition to, or alternatively than digital controls about which a plurality of inputs may be received. Pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, at least aircraft command. A pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. The manipulation of a pilot control may constitute an aircraft command. A pilot control may be physically located in the cockpit of an aircraft or remotely located outside of the aircraft in another location communicatively connected to at least a portion of the aircraft. A pilot input and/or control may include a collective, inceptor, foot bake, steering and/or control wheel, control stick, pedals, throttle levers, or the like. "Communicatively connected," for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicatively connecting includes electrically coupling an output of one device, component, or circuit to an input of another device, component, or circuit. Communicatively connecting may be performed via a bus or other facility for intercommunication between elements of a computing device. Communicatively connecting may include indirect connections via "wireless" connection, low power wide area network, radio communication, optical communication, magnetic, capacitive, or optical coupling, or the like.

In various embodiments, sensor 132 may include an inertial measurement unit. An "inertial measurement unit," for the purposes of this disclosure, is an electronic device that measures and reports a body's specific force, angular rate, and orientation of the body, using a combination of accelerometers, gyroscopes, and magnetometers, in various arrangements and combinations.

In various embodiments, sensor 132 may include a plurality of sensors in the form of individual sensors or a sensor array. Sensor 132 may include a plurality of independent sensors, where any number of the described sensors may be used to detect any number of physical or electrical phenomenon associated with aircraft 112. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 132 to detect phenomenon may be maintained.

In various embodiments, sensor 132 may be communicatively connected to controller 104, memory 108, display 136, a pilot input, and/or a flight controller so that sensor 132 may transmit and/or receive signals. Signals may include electrical, electromagnetic, visual, audio, radio waves, or another undisclosed signal type alone or in combination. In one or more embodiments, controller 104 may receive an attitude of electric aircraft, such as a yaw, pitch, or roll from sensor 132. In one or more embodiments, controller 104 may be a proportional-integral-derivative (PID) controller. In other embodiments, controller 104 may be a flight controller, which is described further below.

With continued reference to FIG. 1, controller 104 is configured to determine a limitation 120 of pilot control authority. Limitation of pilot control authority may be determined as a function of the condition 128 of aircraft 112. In one or more embodiments, conditions 128 may include environmental conditions, flight component conditions, and the like. For example, condition 128 may include a wind characteristic experienced by aircraft 122. A wind characteristic may impose a force on aircraft 112 such that there may be a limitation on an element. Specifically, and in a non-limiting embodiment, horizontal gusts of wind (gusts of wind parallel to the yaw axis) may limit the yaw of an aircraft 112 by blowing on the rudder. Specifically, and in another non-limiting embodiment, horizontal gusts of wind (gusts of wind parallel to the yaw axis) may limit the yaw of an aircraft 112 due to causing a greater torque needed to yaw the aircraft 112. In another example, and without limitation, condition 128 may include an angle and/or tilt of each propeller of aircraft. In an embodiment, conditions 128, such as flight component failure, may affect/increase limitations 120 on pilot control authority 116. Flight component failure may include failure of an inverter, failure of an actuator controlling a control surface, failure of a propulsor, failure of a motor, failure of an energy source and the like. Flight component failure may cause limitations 120 as a flight component failure may restrict aircraft 112 movement. In another embodiment, conditions 128 such as a low state of charge may affect/increase limitations 120 on pilot control authority 116. A low state of charge may affect how much power each flight component may receive. Additionally, limitation 120 may be determined as a function of a lookup table. For example, lookup table may include information of the torque/displacement of various control surfaces. Specifically, a lookup table may allow a controller 104 to determine a needed torque/output to achieve a certain lift, roll, pitch, yaw, and the like. Based on this information, limitations may be determined as aircraft 112 may not have the output necessary for a certain pilot input 124. Additionally, limitation 120 may be determined as a function of a mixer. A "mixer", for the purposes of this disclosure, may be a component that takes in at least an incoming signal, such as conditions 128 of aircraft 112 and allocates one or more outgoing signals, such as modified attitude commands and output torque command, or the like, to at least a propulsor, flight component, or one or more computing devices connected thereto, thus determining a limitation 120 of pilot control authority 116. One of ordinary skill in the art, after reading the entirety of this disclosure, would be aware that a mixer, as used herein, may additionally or alternatively be described as performing "control allocation" or "torque allocation". Mixer 144 may identify how much moment was generated by aerodynamic forces acting on one or more flight components and propulsors and may feed this back to an inner loop controller and outer loop controller to prevent integral windup. A dynamic inverse of the lift rotor system may be applied to the motor torque command to compensate for the rotor inertia. The pilot input 124, which represents one or more desires of a pilot or user that may include pusher torques, may be directly passed through the controller; full rotation of the pusher throttle yields full torque at the pusher. As discussed previously, the control surface deflections are driven directly from the pilot roll, pitch, and yaw inputs, which may also be included pilot input 124. Mixer may map desired vehicle level control torques (as produced by the inner loop controller) to appropriate actuator outputs via knowledge of the vehicle layout and properties. In the case that motor saturation prevents the achievement of the desired vehicle level control torques (i.e. limitations 120), the mixer will deprioritize the yaw moment, then assisted lift, then roll moment, and finally pitch moment.

Continuing to reference FIG. 1, limitation 120 may be calculated as a function of element prioritization. For example, controller 104 may make sure that pitch commands are satisfied before roll commands. Pitch commands may refer to inputs by a pilot that affect pitch. In an embodiment, controller 104 may prioritize elements in the order of pitch, roll, lift, and yaw. Satisfying the pitch command may cause resulting limitations on other elements. For instance, in hover mode (discussed in FIG. 3), the aircraft 112 may yaw by applying more thrust to certain propulsors and less to others. In this instance, if a pilot inputs a lift command that causes the propulsors to output full or nearly full torque, then the aircraft 112 may be limited in yaw as there is no way to vary thrust between propulsors since they are all at full/nearly full torque.

With continued reference to FIG. 1, mixer may include a logic circuit. Mixer may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Mixer may be implemented using a controller. Mixer may solve an optimization problem. Optimization problem may include solving the pitch moment function that may be a nonlinear program.

Torque allocation performed by mixer may be consistent with the description of torque allocation in U.S. patent application Ser. No. 17/197,427 filed on Mar. 10, 2021 and titled, "SYSTEM AND METHOD FOR FLIGHT CONTROL IN ELECTRIC AIRCRAFT", which is incorporated herein in its entirety by reference.

Figure 2A:
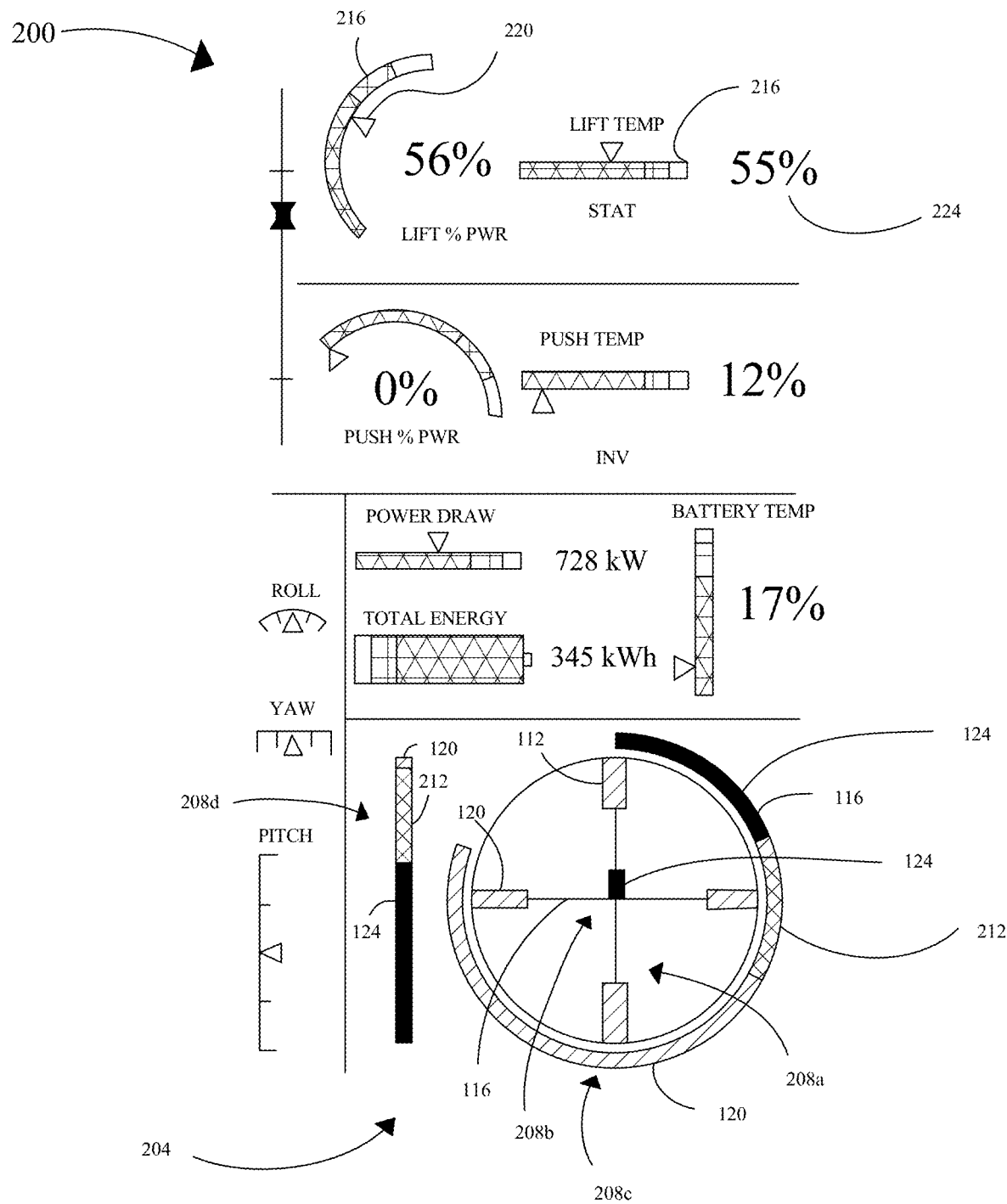
FIG. 2A is schematic diagram of a visual representation of pilot control authority in accordance with one or more embodiments of the present disclosure.
Figure 2B:
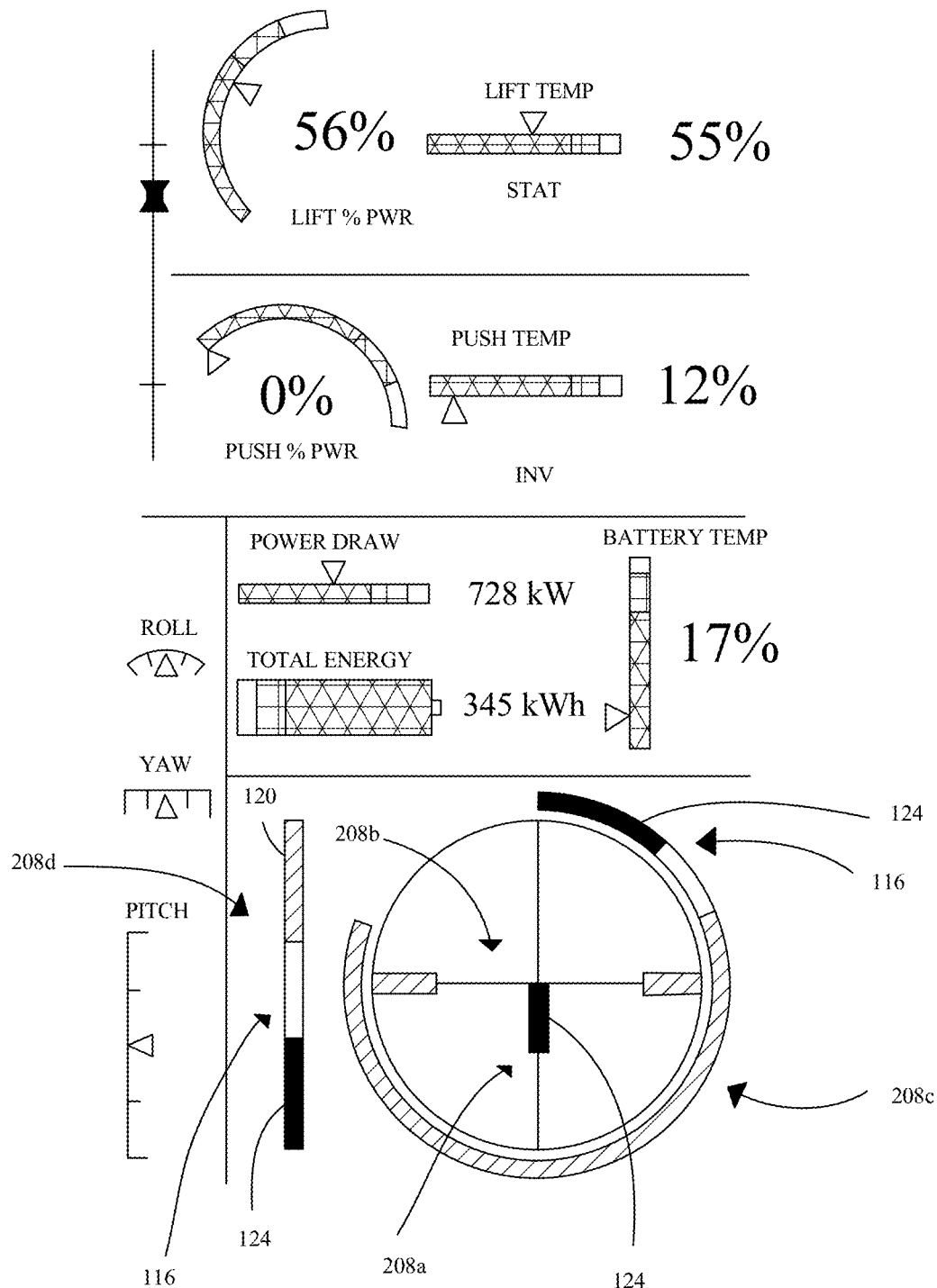
FIG. 2B is another schematic diagram of a visual representation of pilot control authority in accordance with one or more embodiments of the present disclosure.

Now referring to FIGS. 2A and 2B, an exemplary embodiment of a visual representation 200 of pilot control authority of an element. In an embodiment, visual representation 200 may be presented on a display 136, shown in FIG. 1. As used herein, a display is a device for displaying visual data. Display 136 is configured to present and/or visually and/or verbally convey data and/or information related to pilot control authority 116 of various elements. For example, and without limitation, display 112 may show the pilot control authority 116 of pitch, yaw, roll, and lift, and the limitations 120 associated with those elements. In another example, and without limitation, information generated by controller 104 or sensor 132 may be shown by display 136. In other examples, and without limitation, information stored in and provided by memory 108 may be displayed on display 136. In various embodiments, display 136 may be implemented with an electronic display screen and/or monitor. Exemplary embodiments of electronic display screen may include a cathode ray tube (CRT), light-emitting diode (LED), liquid-crystal display (LCD), an opaque screen, and the like. In various embodiments, display 136 may be implemented with a projection screen and/or display. For example, and without limitation, display 136 may include a head-up display, a projector screen, a pico-projection display, a retinal display, and the like. In one or more embodiments, display 136 may include a monochrome or color display. Display 136 may be suitable for presenting a user-viewable image of one or more visual representations related to generated and/or provided information discussed in this disclosure. In some embodiments, visual representation 200 may also be shown on an existing display of an external and/or remote device, such as a remote computing device, laptop, desktop, mobile phone, tablet, electric aircraft 112 information display system, or any other devices that may receive flight transition information from processor, sensor, memory, a remote computing device, and the like, to present flight transition information to a user. In some embodiments, display 136 may receive and display data and/or information converted and/or generated from controller 104. In other embodiments, display 136 may receive and display collected data and/or information directly from sensor 132. In other embodiments, display 136 may receive and show data and/or information stored and retrieved from memory 108. Data and information from memory 108 may be transferred from memory 108 via controller 104. Display 136 may be configured to present, indicate, or otherwise convey images and or symbols, such as text, related to a pilot control authority 116.

Still referring to FIGS. 2A and 2B, visual representation 200 includes an indicator 204. As used herein, an "indicator" is graphical display of information. Indicator 204 may be configured to show the pilot control authority 116 for pitch, yaw, roll, and lift. Indicator 204 may include a plurality of sub-indicators 208a-d. Indicator 204 may include graphics such as bars, circles, and shading for the bars and/or circles to represent pilot control authority 116, pilot input 124, and limitations 120. Indicator 204 may also show when a pilot input 124 exceeds a limitation. This is shown as 212 in FIGS. 2A and 2B. Indicator may include a circle wherein pitch, yaw, and roll are shown. Indicator 204 may also include a vertical side bar configured to show lift. Indicator 204 may include various shadings and/or colors to display a pilot input 124 and/or a limitation 120. For example, a pilot input 124 may be shown as a solid shaded section. A limitation 120 may be shown as a hatched section. A limitation 120 may be shown with different colors, such as gray, yellow, red, and the like. A pilot input 124 that exceeds limitation 120 may be shown as a red hatched section (excess 212). Alternatively, a pilot input 124 that exceeds limitation 120 may be shown using a hatching different than the hatching to show limitation 120, as shown in FIG. 2. Alternatively, or additionally, colors may be used instead of hatching or shading to show limitation 120, pilot input 124, and the like. Pilot control authority 116 of each element may be represented by the lack of shading or hatching, as shown in FIGS. 2A and 2B. Each sub-indicator 208a-d may be configured to represent each of the elements. For example, sub-indicator 208a may be configured to represent pitch. Sub-indicator 208a may be located on a vertical axis located inside a circle graphic. Vertical axis, in its entirety, located inside circle graphic may indicate the pilot control authority 116 for pitch. A solid bar located on vertical axis may indicate the pilot input 124 for pitch. In FIG. 2A, sub-indicator 208a shows a positive angle of attack/upward pitch. In FIG. 2B, sub-indicator 208a shows a negative angle of attack/pitch downward. Sub-indicator 208a may also include hatching to show the limitations 120 in pitch. Sub-indicator 208b may represent roll of the aircraft. In an embodiment, sub-indicator 208b may be located on the horizontal axis located inside a circle graphic, which as a whole, represents pitch, yaw, and roll. In FIGS. 2A and 2B, sub-indicator 208b shows that roll is limited. Sub-indicator 208c may represent yaw. Sub-indicator 208c may displayed exterior of the circle graphic. For example, in FIG. 2A, pilot input 124 may be shown to exceed limitation 120 by an amount shown as a cross-hatch, or the like. In FIG. 2B, the pilot input 124 for yaw is shown to be below the pilot control authority 116. Sub-indicator 208d may represent lift. Sub-indicator 208d may be a second vertical axis located adjacent to the circle graphic. In sub-indicator 208, limitation 120, pilot input 124, and pilot control authority 116 may be represented by various colors, hatching, numbers, and the like. In some embodiments, pilot control authority 116 may be a portion of sub-indicator 208 that is not a limitation 120, Still referencing FIGS. 2A and 2B, indicator 204 may show details regarding the elements via the location, length, percentage of completion of the various sub-indicators 208. Indicator 204 may be normalized to 100% torque. In an embodiment, the full pilot control authority 116 (with no limitations 120) may represent 100% torque. Limitations 120 may be shown on indicator 204 as a proportion of the full torque. Pilot input 124 shown on each sub-indicator 208a-d may represent a pilot's commanded torque input in each element. A region in indicator 204/sub-indicator 208 that is both hatched and shaded may represent over-command. As used herein, "over-command" is where input exceeds proportions available. In some cases, limitation 120, pilot input 124, pilot control authority 116, and the like may be shown using LEDs, and other light-emitting components. Light-emitting components may include one or more light bulbs, LEDs, at least a portion of display 136, and the like.

In some embodiments, and still referencing FIGS. 2A and 2B, visual representation 200 may include other graphics that may represent conditions 128 on aircraft 112. For example, a graphic may be used to indicate a range. A range may include a range of temperatures, a range of percentage of power, a range of energy available, a range of power draw, and the like. Range may be visually represented as a band 216. In some embodiments, band 216 may be a linear region indicated by colors or lines on display 136. In other embodiments, band 216 may include an arcuate region indicated by colors and/or lines on display 136. A position of a mark 220 may represent the current condition 128 within the range on band 216. In other embodiments, band 216 may be bent like an arc. Additionally, labels 224 may be used adjacent various graphics to describe the graphics. Labels 224 may be used to describe the position of mark 220. Labels may include measurements gathered from sensor 132, percentages, descriptors of graphics, and the like.

Figure 3:
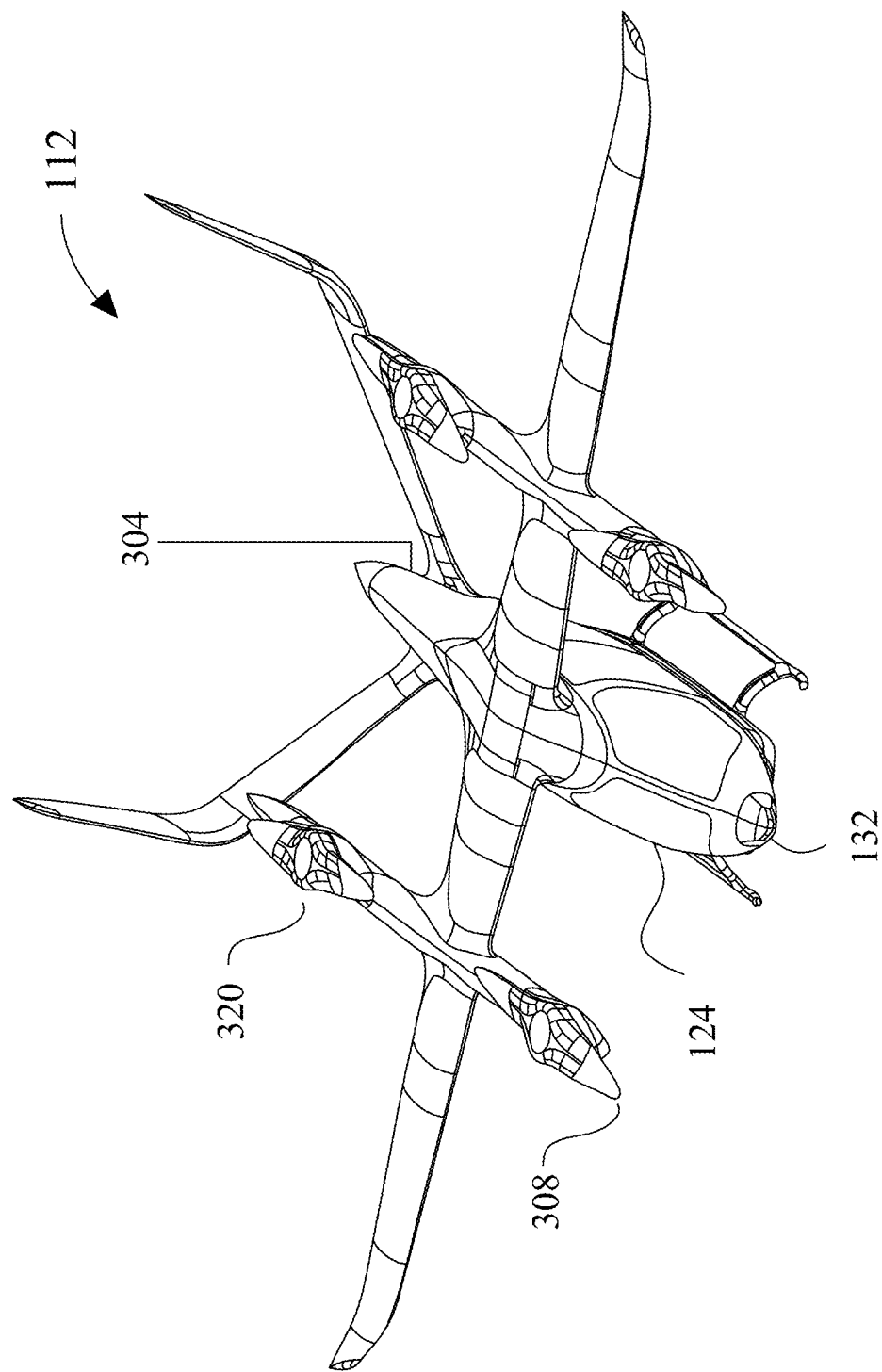
FIG. 3 is a schematic diagram of an exemplary embodiment of an electric aircraft in accordance with one or more embodiments of the present disclosure.

Referring now to FIG. 3, an exemplary embodiment of an aircraft 112 is illustrated. Aircraft 112 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 3, aircraft 112 may include a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may comprise structural elements that physically support the shape and structure of an aircraft. Structural elements may take a plurality of forms, alone or in combination with other types. Structural elements may vary depending on the construction type of aircraft and specifically, the fuselage. Fuselage 304 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 3, aircraft 112 may include a plurality of flight components 308. In an embodiment, flight component 308 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 3, a plurality of flight components 308 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of flight components 308 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of flight components 308 may include a rudder, which may include, without limitation, a segmented rudder that produces a torque about a vertical axis. Additionally or alternatively, plurality of flight components 308 may include other flight control surfaces such as propulsors, rotating flight controls, or any other structural features which can adjust movement of aircraft 112. Plurality of flight components 308 may include one or more rotors, turbines, ducted fans, paddle wheels, and/or other components configured to propel a vehicle through a fluid medium including, but not limited to air.

Still referring to FIG. 3, plurality of flight components 308 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 3, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 3.2° inward and/or 1.7° forward. As a further non-limiting example, a fixed angle may be an angle of 3.6° outward and/or 3.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 3, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 3, plurality of flight components 308 may include power sources, control links to one or more elements, fuses, and/or mechanical couplings used to drive and/or control any other flight component. Plurality of flight components 308 may include a motor that operates to move one or more flight control components and/or one or more control surfaces, to drive one or more propulsors, or the like, wherein a motor is described below. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

Still referring to FIG. 3, plurality of flight components 308 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 3, an energy source may be used to provide a steady supply of electrical power to a load over a flight by an electric aircraft 112. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, an energy source may include a plurality of energy sources (such as a plurality of battery cells 104), referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157; 16/948,140 both entitled "SYSTEM AND METHOD FOR HIGH ENERGY DENSITY BATTERY MODULE" by S. Donovan et al., which are incorporated in their entirety herein by reference.

Still referring to FIG. 3, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 3, another exemplary actuator may include landing gear. Landing gear may be used for take-off and/or landing/Landing gear may be used to contact ground while aircraft 112 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 3, aircraft 112 may include a pilot input 124, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of flight components 308. For example and without limitation, collective control may alter and/or adjust the pitch angle of all of the main rotor blades collectively. For example, and without limitation pilot input 124 may include a yoke control. As used in this disclosure a "yoke control" is a mechanical control of an aircraft to control the pitch and/or roll. For example and without limitation, yoke control may alter and/or adjust the roll angle of aircraft 112 as a function of controlling and/or maneuvering ailerons. In an embodiment, pilot input 124 may include one or more foot-brakes, control sticks, pedals, throttle levels, and the like thereof. In another embodiment, and without limitation, pilot input 124 may be configured to control a principal axis of the aircraft. As used in this disclosure a "principal axis" is an axis in a body representing one three dimensional orientations. For example, and without limitation, principal axis or more yaw, pitch, and/or roll axis.

Still referring to FIG. 3, pilot input 124 may be configured to modify a variable pitch angle. For example, and without limitation, pilot input 124 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot input 124 may modify the variable pitch angle from a first angle of 3.71° to a second angle of 3.82°. Additionally or alternatively, pilot input 124 may be configured to translate a pilot desired torque. For example, and without limitation, pilot input 124 may translate that a pilot's desired torque for a propeller be 160 lb. ft. of torque. As a further non-limiting example, pilot input 124 may introduce a pilot's desired torque for a propulsor to be 390 lb. ft. of torque. Additional disclosure related to pilot input 124 may be found in U.S. patent application Ser. Nos. 17/001,845; 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 3, aircraft 112 may include a loading system. A loading system may include a system configured to load an aircraft of either cargo or personnel. For instance, some exemplary loading systems may include a swing nose, which is configured to swing the nose of aircraft of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 3, aircraft 112 may include sensor 132. As discussed above, sensor 132 may be configured to detect a condition 128 of an aircraft 112 and/or a pilot input 124, and the like.

Still referring to FIG. 3, electric aircraft 112 may include at least a motor 320, which may be mounted on a structural feature of the aircraft. Design of motor 320 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 320 may include two main holes in top and bottom of mounting area to access bearing cartridge. Further, a structural feature may include a component of electric aircraft 112. For example, and without limitation structural feature may be any portion of a vehicle incorporating motor 320, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 308. Persons skilled in the art, upon reviewing the entirety of this disclosure, will be aware of various materials, combinations of materials, and/or constructions techniques.

Still referring to FIG. 3, electric aircraft 112 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter,"

multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft 112 during flight. Forces acting on electric aircraft 112 during flight may include, without limitation, thrust, the forward force produced by the rotating element of the electric aircraft and acts parallel to the longitudinal axis. Another force acting upon electric aircraft 112 may be, without limitation, drag, which may be defined as a rearward retarding force which is caused by disruption of airflow by any protruding surface of the electric aircraft 112 such as, without limitation, the wing, rotor, and fuselage. Drag may oppose thrust and acts rearward parallel to the relative wind. A further force acting upon electric aircraft 112 may include, without limitation, weight, which may include a combined load of the electric aircraft 112 itself, crew, baggage, and/or fuel. Weight may pull electric aircraft 112 downward due to the force of gravity. An additional force acting on electric aircraft 112 may include, without limitation, lift, which may act to oppose the downward force of weight and may be produced by the dynamic effect of air acting on the airfoil and/or downward thrust from the propulsor 308 of the electric aircraft. Lift generated by the airfoil may depend on speed of airflow, density of air, total area of an airfoil and/or segment thereof, and/or an angle of attack between air and the airfoil. For example, and without limitation, electric aircraft 112 are designed to be as lightweight as possible. Reducing the weight of the aircraft and designing to reduce the number of components is essential to optimize the weight. To save energy, it may be useful to reduce weight of components of electric aircraft 112, including without limitation propulsors and/or propulsion assemblies. In an embodiment, motor 320 may eliminate need for many external structural features that otherwise might be needed to join one component to another component. Motor 320 may also increase energy efficiency by enabling a lower physical propulsor profile, reducing drag and/or wind resistance. This may also increase durability by lessening the extent to which drag and/or wind resistance add to forces acting on electric aircraft 112 and/or propulsors.

Figure 4:
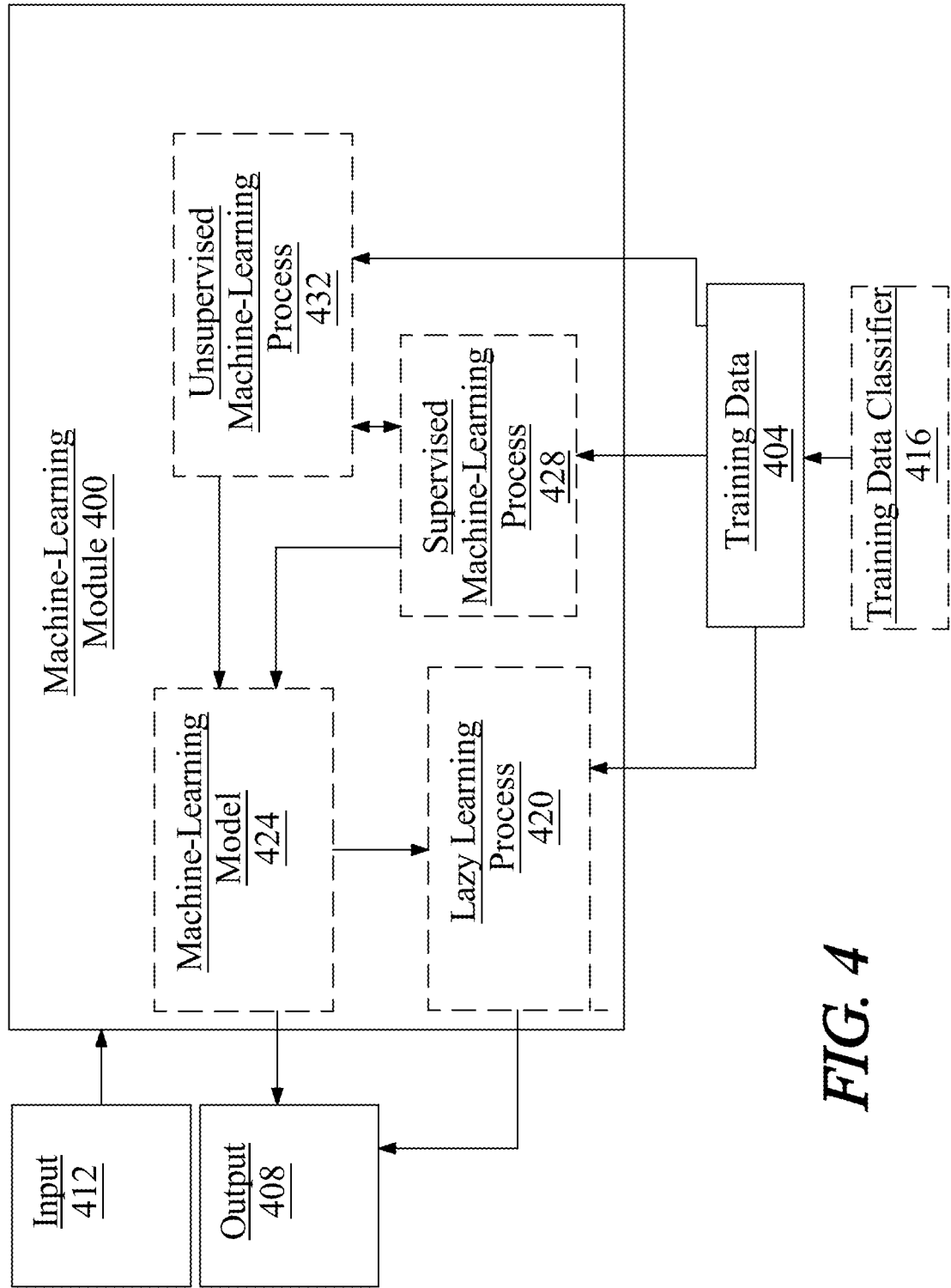
FIG. 4 is an exemplary embodiment of a machine-learning system in accordance with one or more embodiments of the present disclosure.

Referring now to FIG. 4, an exemplary embodiment of a machine-learning module 400 that may perform one or more machine-learning processes as described in this disclosure is illustrated. Machine-learning module 400 may be implemented in the determination of the flight states of the electric aircraft. Machine-learning module 400 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example conditions of aircraft may be inputs, wherein an output may be an limitation.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
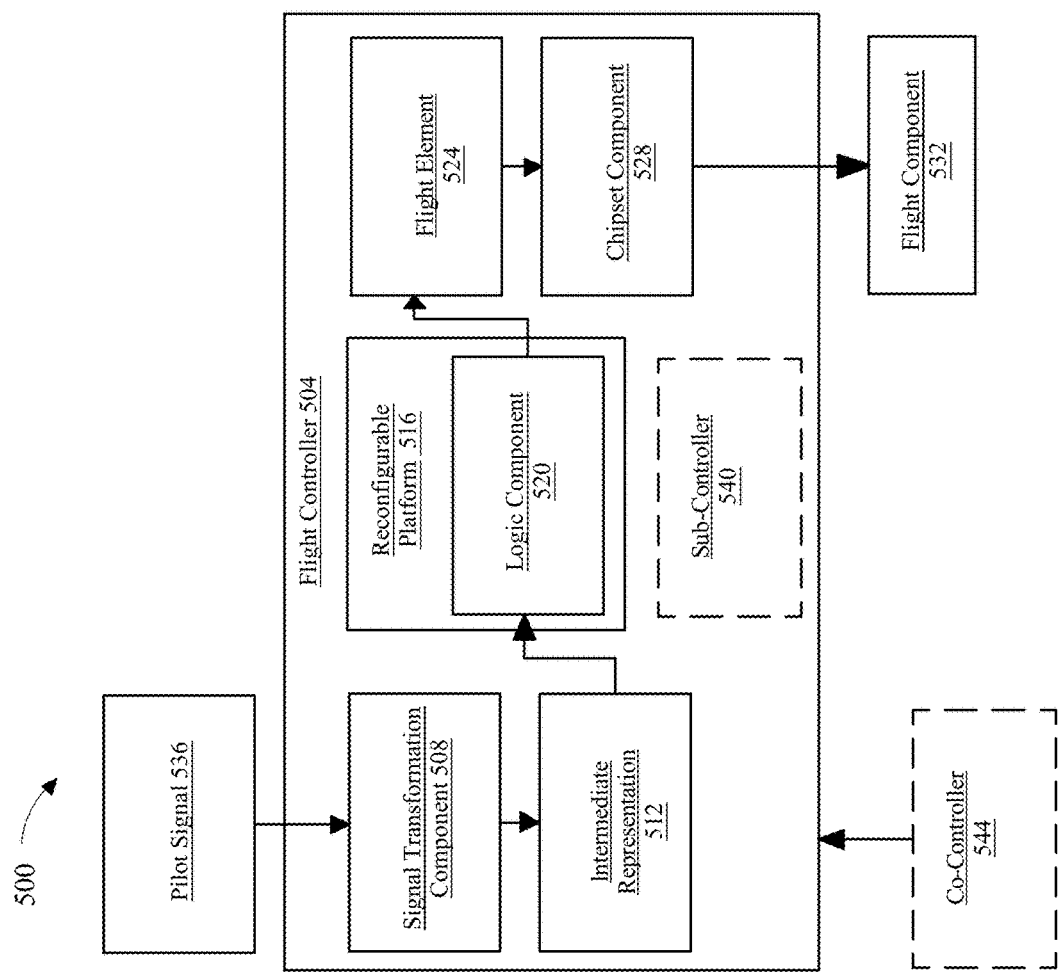
FIG. 5 is a block diagram of an exemplary embodiment of a flight controller system in accordance with one or more embodiments of the present disclosure.

Now referring to FIG. 5, an exemplary embodiment 500 of a flight controller 504 is illustrated. (Flight controller 124 of FIG. 1 and FIG. 2 may be the same as or similar to flight controller 504.) As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs xi that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
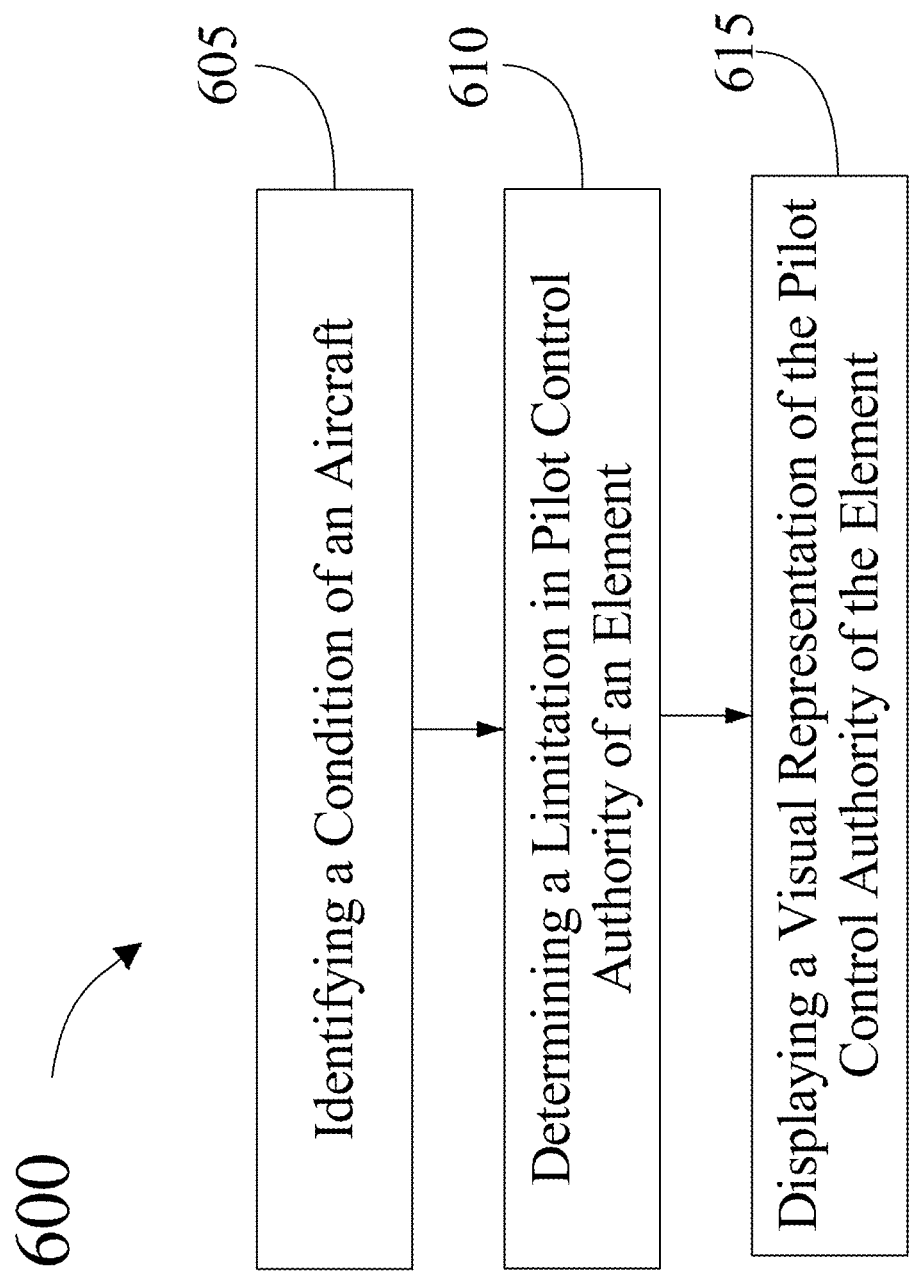
FIG. 6 is a flow diagram of an exemplary method for displaying pilot control authority.

Now referring to FIG. 6, a method 600 for displaying pilot control authority is illustrated. Step 605 of method 600 includes identifying, by a controller, a condition of an aircraft. A condition of the aircraft may include state of charge of an energy source, and/or a flight component failure. Aircraft may be an eVTOL aircraft. This step may be implemented without limitation as described in FIGS. 1-5.

Step 610 of method 600 includes determining, using a controller, a limitation in pilot control authority of an element. The element may include pitch, yaw, roll, or lift. The limitation may be determined as a function of the condition of the aircraft. The limitation may also be determined as a function of a mixer in the controller. Controller may be onboard the aircraft or remote to the aircraft. Controller may be a flight controller, or the like. This step may be implemented without limitation as described in FIGS. 1-5.

Step 615 of method 600 includes displaying, using an indicator on a display communicatively connected to the controller, a visual representation of the pilot control authority of the element. Indicator may show a pilot input. Indicator may show a limitation of pilot control authority of an element. This step may be implemented without limitation as described in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
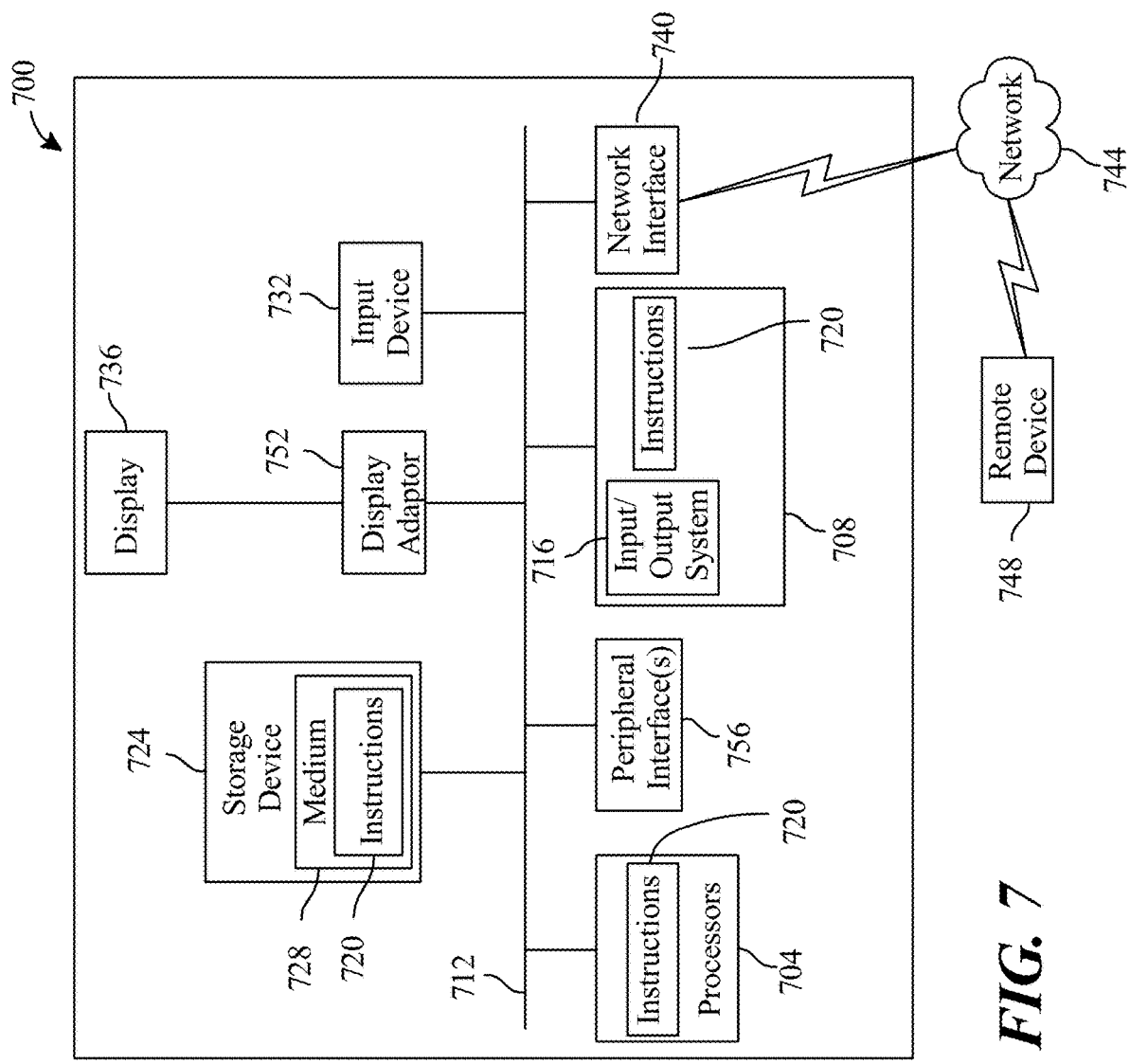
FIG. 7 is a block diagram of an exemplary embodiment of a computing system in accordance with one or more embodiments of the present disclosure.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus of an aircraft configured to display pilot control authority, the apparatus comprising:
a controller; and
a memory communicatively connected to the controller, the memory containing instructions that, when executed, configure the controller to:
receive an operating state of a propulsion assembly of the aircraft and an operating limit of the propulsion assembly;
determine, based on the operating state and the operating limit, an extent of the pilot control authority of the aircraft in at least one of a pitch control direction, a roll control direction, or a yaw control direction; and
a display communicatively connected to the controller and including an indicator that comprises a visual representation of the pilot control authority, wherein the indicator is configured to dynamically change in response to real-time changes in the operating state or the operating limit to indicate a corresponding change in the extent of the pilot control authority.

2. The apparatus of claim 1, wherein the propulsion assembly includes an electric lift propulsor, a motor, and an inverter.

3. The apparatus of claim 1, wherein the operating state comprises one or more of a state of charge of an energy source of a propulsor included in the propulsion assembly or the aircraft.

4. The apparatus of claim 3, wherein the extent of the pilot control authority is based on the state of charge of the energy source.

5. The apparatus of claim 1, wherein the indicator comprises a sliding scale.

6. The apparatus of claim 1, wherein the operating limit indicates a reduction in an amount of the pilot control authority of the aircraft.

7. The apparatus of claim 1, wherein the extent of the pilot control authority may comprise causing a change in a control feature of the propulsion assembly.

8. The apparatus of claim 7, wherein the control feature comprises causing the change in one or more of a speed of a motor, torque of the motor, or a blade pitch of the motor.

9. An aircraft comprising:
a controller; and
a memory communicatively connected to the controller, the memory containing instructions that, when executed, configure the controller to:
receive an operating state of a propulsion assembly of the aircraft and an operating limit of the propulsion assembly;
determine, based on the operating state and the operating limit, an extent of pilot control authority of the aircraft in at least one of a pitch control direction, a roll control direction, or a yaw control direction; and
a display communicatively connected to the controller and including an indicator that comprises a visual representation of the pilot control authority, wherein the indicator is configured to dynamically change in response to real-time changes in the operating state or the operating limit to indicate a corresponding change in the extent of the pilot control authority.

10. The aircraft of claim 9, wherein the propulsion assembly includes an electric lift propulsor, a motor, and an inverter.

11. The aircraft of claim 9, wherein the operating state and the operating limit are received in response to receiving a pilot input, the pilot input being associated with attitude control of the aircraft.

12. The aircraft of claim 9, wherein the operating state comprises one or more of a state of charge of an energy source of the propulsion assembly or the aircraft.

13. The aircraft of claim 12, wherein the extent of the pilot control authority is based on the state of charge of the energy source.

14. The aircraft of claim 9, wherein the indicator comprises a sliding scale.

15. The aircraft of claim 9, wherein the operating limit indicates a reduction in an amount of the pilot control authority of the aircraft.

16. The aircraft of claim 9, wherein the extent of the pilot control authority may comprise causing a change in a control feature of the propulsion assembly.

17. The aircraft of claim 16, wherein the control feature comprises causing the change in one or more of a speed of a motor, torque of the motor, or a blade pitch of the motor.

18. A method implemented by a controller of an aircraft to display pilot control authority, the method comprising:
   receiving an operating state of a propulsion assembly of the aircraft and an operating limit of the propulsion assembly;
   determining, based on the operating state and the operating limit, an extent of the pilot control authority of the aircraft in at least one of a pitch control direction, a roll control direction, or a yaw control direction; and
   causing, based on the determining, display of an indicator that comprises a visual representation of the pilot control authority, wherein the indicator is configured to change in response to real-time changes in the operating state or the operating limit to indicate a corresponding change in the extent of the pilot control authority.

19. The method of claim 18, wherein the operating state and the operating limit are received in response to receiving a pilot input, the pilot input being associated with attitude control of the aircraft.

20. The method of claim 18, wherein the indicator changes dynamically, the changes comprising one more of a change in a position, a color, a size, an orientation of a visual element associated with the operating state, the operating limit, or the pilot control authority.

* * * * *